United States Patent
Giampaolo et al.

(10) Patent No.: US 9,294,566 B2
(45) Date of Patent: *Mar. 22, 2016

(54) DATA SYNCHRONIZATION

(71) Applicant: Apple Inc., Cupertino, CA (US)

(72) Inventors: Dominic B. Giampaolo, Mountain View, CA (US); Jean-Gabriel Morard, Paris (FR)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/518,938

(22) Filed: Oct. 20, 2014

(65) Prior Publication Data

US 2015/0106330 A1    Apr. 16, 2015

Related U.S. Application Data

(63) Continuation of application No. 13/349,519, filed on Jan. 12, 2012, now Pat. No. 8,868,500.

(60) Provisional application No. 61/433,173, filed on Jan. 14, 2011.

(51) Int. Cl.
*G06F 17/30* (2006.01)
*G06F 7/00* (2006.01)
*H04L 29/08* (2006.01)

(52) U.S. Cl.
CPC ...... *H04L 67/1095* (2013.01); *G06F 17/30174* (2013.01); *G06F 17/30209* (2013.01); *G06F 17/30575* (2013.01); *G06F 17/30578* (2013.01)

(58) Field of Classification Search
None
See application file for complete search history.

(56) References Cited

U.S. PATENT DOCUMENTS

| | | | |
|---|---|---|---|
| 6,272,545 B1 | 8/2001 | Flanagin et al. | |
| 6,401,104 B1 | 6/2002 | LaRue et al. | |
| 7,680,067 B2 | 3/2010 | Prasad et al. | |
| 7,778,962 B2* | 8/2010 | Shah et al. | 707/610 |
| 7,805,403 B2* | 9/2010 | Freedman | 707/612 |
| 8,255,359 B2* | 8/2012 | Quinlan et al. | 707/613 |
| 8,805,783 B2* | 8/2014 | Muhunthan et al. | 707/626 |
| 2003/0023619 A1 | 1/2003 | Beyda | |
| 2004/0148317 A1 | 7/2004 | Sundararajan | |
| 2005/0086272 A1 | 4/2005 | Novik | |
| 2006/0101081 A1 | 5/2006 | Lin et al. | |
| 2006/0190500 A1* | 8/2006 | Rao et al. | 707/203 |
| 2006/0190506 A1* | 8/2006 | Rao et al. | 707/204 |

(Continued)

OTHER PUBLICATIONS

Novik et al, "Peer-to-Peer Replication in WINFS," Retrieved from the Internet: URL: http://research.microsoft.com/pubs/65604/tr-2006--78.pdf [retrieved on Mar. 27, 2012], Jun. 1, 2006, pp. 1-17.

(Continued)

*Primary Examiner* — Dung K Chau
(74) *Attorney, Agent, or Firm* — Fish & Richardson P.C.

(57) ABSTRACT

Methods, systems, and apparatus, including computer programs encoded on a computer storage medium, for data synchronization. In general, one aspect of the subject matter described in this specification can be embodied in methods that include the actions of receiving a knowledge vector from a first device of the pair of devices, the knowledge vector identifying data items and latest changes to the data items known to the peer device; comparing, at a second device of the pair of devices, the received knowledge vector with a local knowledge vector for changes unknown to the first device; and sending a list of changes to the first device.

18 Claims, 6 Drawing Sheets

(56) References Cited

U.S. PATENT DOCUMENTS

| | | |
|---|---|---|
| 2006/0215569 A1* | 9/2006 | Khosravy et al. ............. 370/241 |
| 2007/0014314 A1 | 1/2007 | O'Neil |
| 2007/0294366 A1* | 12/2007 | Ozzie ................ G06F 17/30578 709/217 |
| 2008/0005188 A1 | 1/2008 | Li et al. |
| 2008/0144669 A1 | 6/2008 | Lee et al. |
| 2008/0165807 A1 | 7/2008 | Nilo et al. |
| 2008/0195759 A1 | 8/2008 | Novik et al. |
| 2008/0222296 A1 | 9/2008 | Lippincott |
| 2008/0270481 A1* | 10/2008 | Augustine ......... G06F 17/30581 |
| 2009/0006498 A1 | 1/2009 | Freedman |
| 2009/0077002 A1 | 3/2009 | Clark et al. |
| 2010/0198784 A1 | 8/2010 | Serlet |
| 2011/0016087 A1* | 1/2011 | Freedman ..................... 707/617 |
| 2011/0158260 A1* | 6/2011 | Piwonka et al. ............. 370/503 |

OTHER PUBLICATIONS

Notification of Transmittal of the International Search Report and the Written Opinion of the International Searching Authority, or the Declaration, dated Jul. 4, 2012.

Open Mobile Alliance: DS Protocol Approved Version 1.2 OMA-TS-DS Protocol-V1_2-20060710-A, Internet Citation, Jul. 10, 2006.

\* cited by examiner

DATA SYNCHRONIZATION

CROSS-REFERENCE TO RELATED APPLICATIONS

This application claims the benefit under 35 U.S.C. §119 (e) of the filing date of U.S. Patent Application No. 61/433,173, for Data Synchronization, which was filed on Jan. 14, 2011, and which is incorporated here by reference.

BACKGROUND

This specification relates to data synchronization.

Users can transfer data between devices. Typically, users share data with others through file transfer or sharing. For example, a user can identify a particular file to send to others, e.g., by e-mail or using a file transfer protocol. File sharing allows other users, e.g., on a network, to access files, however the files typically remain at their original location. Alternatively, files can be checked out from their original storage location by others, but typically the only user that can modify the file is the one that checked the file out.

Conventional systems also allow for users to synchronize data between the user's devices (e.g., a laptop computer and a mobile device). Often, only particular types of data are synchronized between devices or the synchronization has to be initiated by the user.

SUMMARY

This specification describes technologies relating to data synchronization.

In general, one aspect of the subject matter described in this specification can be embodied in methods that include the actions of receiving a knowledge vector from a first device of the pair of devices, the knowledge vector identifying data items and latest changes to the data items known to the peer device; comparing, at a second device of the pair of devices, the received knowledge vector with a local knowledge vector for changes unknown to the first device; and sending a list of changes to the first device. Other embodiments of this aspect include corresponding systems, apparatus, and computer programs recorded on computer storage devices, each configured to perform the operations of the methods.

These and other embodiments can each optionally include one or more of the following features. The method further includes receiving a request from the first device for one or more data items corresponding to one or more respective changes in the list of changes; and sending the requested data items. The knowledge vector includes a local rank. The knowledge vector has a compact representation identifying the data item and latest change identifier known to the first device. The change identifier for a data item is incremented each time the data item is modified by a device of a plurality of devices in which the data item is synchronized. Synchronization between the pair of deices is initiated by the first device as having a lowest device identifier of the pair.

In general, one aspect of the subject matter described in this specification can be embodied in methods that include the actions of identifying a first version of a data item to synchronize from a first device; identifying a second version of the data item to synchronize from a second device; determining whether there is a conflict between the first version and the second version; if there is a conflict, automatically resolving the conflict including selecting a conflict winner and storing a copy of the conflict loser. Other embodiments of this aspect include corresponding systems, apparatus, and computer programs recorded on computer storage devices, each configured to perform the operations of the methods.

These and other embodiments can each optionally include one or more of the following features. Determining whether there is a conflict further includes: identifying a change identifier for each of the first version of the data item and the second version of the data item; and using the respective change identifiers to determine a creation time between each version as being within a specified threshold. Automatically resolving the conflict further includes: identifying a device identifier for each of the first device and the second device; and resolving the conflict in favor of the version of the data item associated with the lowest device identifier.

In general, one aspect of the subject matter described in this specification can be embodied in methods that include the actions of identifying a plurality of devices, each device of the plurality of devices having a unique numerical identifier; forming a logical arrangement of the plurality of devices such that peer devices are arranged in numerical order according to the respective numerical identifiers; and synchronizing data between pairs of adjacent devices according to the logical arrangement. Other embodiments of this aspect include corresponding systems, apparatus, and computer programs recorded on computer storage devices, each configured to perform the operations of the methods.

These and other embodiments can each optionally include one or more of the following features. The device having the lowest numerical identifier is considered adjacent to the device having the highest numerical identifier. For a pair of devices, the synching is initiated by the device having the lowest numerical identifier.

In general, one aspect of the subject matter described in this specification can be embodied in methods that include the actions of identifying a plurality of devices associated with a primary identity; identifying one or more devices associated with one or more secondary identities; synching a first set of data with each of the plurality of devices associated with the primary identity; and synching user specified second set of data with each of the one or more devices associated with the secondary identities. Other embodiments of this aspect include corresponding systems, apparatus, and computer programs recorded on computer storage devices, each configured to perform the operations of the methods.

These and other embodiments can each optionally include one or more of the following features. The first set of data is a first user specified collection of data and the second set of data is a distinct second user specified collection of data.

Particular embodiments of the subject matter described in this specification can be implemented so as to realize one or more of the following advantages. Data synchronization can be trickled out as changes occur. Synchronization can occur between devices of a single identity (e.g., a user's device) as well as between identities (e.g., synchronization of particular data with other users). Synchronization can initially identify the data items to be synched, which can actually be synchronized later or on demand, reducing network data traffic. Synchronization can be ordered between devices to reduce network communications. Conflict resolution can be performed automatically, without user input, while allowing conflict losers to be stored for later user retrieval.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Data can be synchronized both between devices associated with the same user identity (e.g., between a user's laptop and mobile phone) as well as between devices associated with different identities (e.g., shared synchronized data between different users).

A group of devices between which data is synchronized can be logically arranged in a circle according to an ordering of device identifier values. Data can be synchronized between pairs of devices in the logical circle. This reduces data traffic resulting from every device trying to synchronize individually with each other device. Additionally, synchronization information can be transmitted using a compact representation of change identifiers, for example, as a change vector. Thus, only identifiers representing the latest versions of data items need to be transmitted to facilitate synchronization rather than all versions, reducing network traffic during synchronization.

Two versions of a data item being synchronized can have creation times within a threshold time. This results in a conflict between the two versions of the data item. The conflict is automatically resolved based on the device identifiers associated with the respective versions. The conflict loser can be stored such that it can be retrieved if requested.

Figure 1:
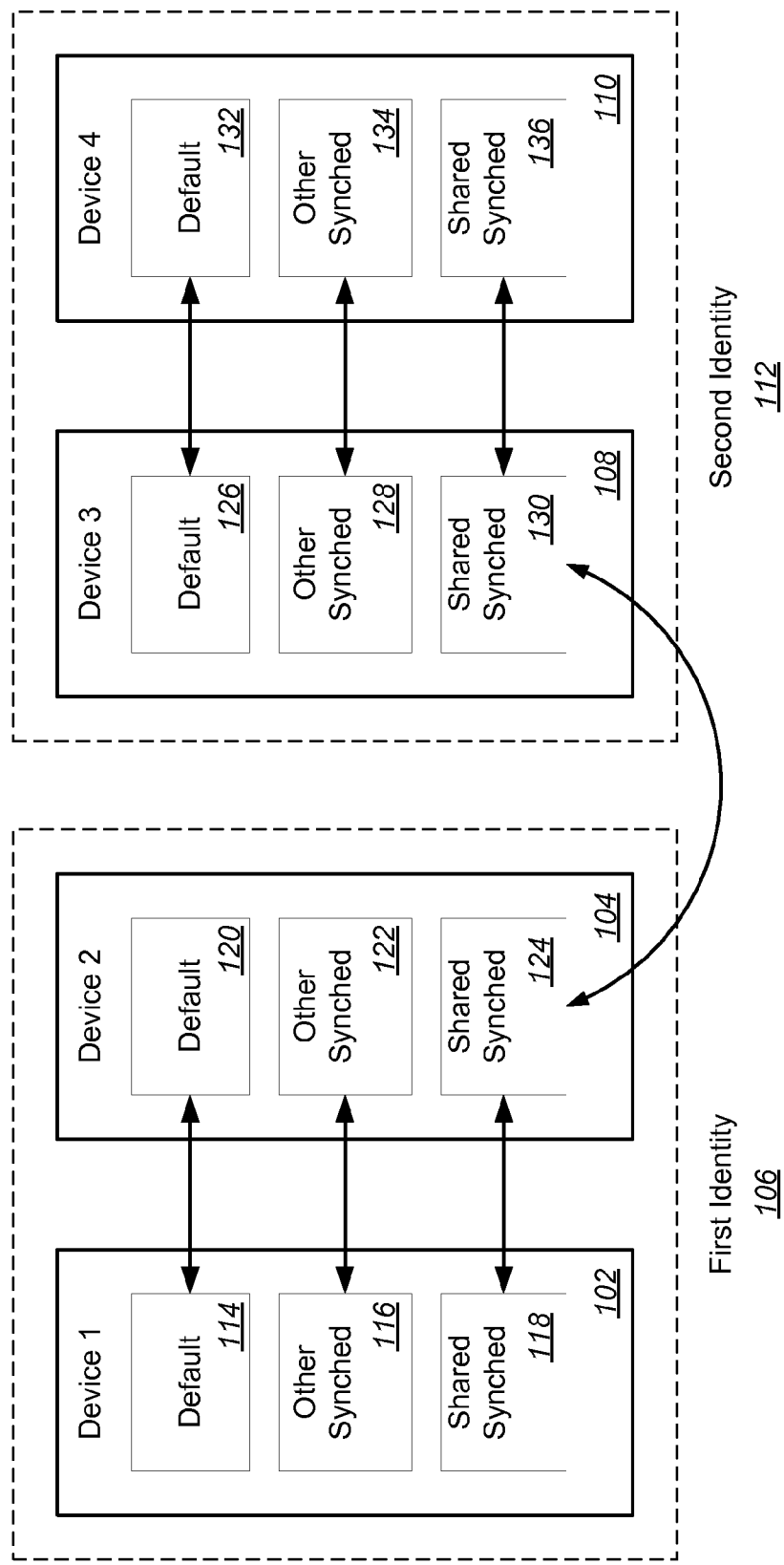
FIG. 1 is a diagram illustrating an example of synchronization within and between identities.

FIG. 1 is a diagram 100 illustrating an example of synchronization within and between identities. Diagram 100 shows a device 102 and device 104 associated with a first identity 106 and a device 108 and device 110 associated with a second identity 112. The devices can include, for example, desktop or laptop computing devices, mobile devices, tablet devices, personal data assistants, or other computing devices.

Device 102 includes default synched data 114, other synched data 116, and shared synched data 118. The default synched data 114 can include data that is synchronized between devices of the same identity by default (e.g., e-mail). The other synched data 116 can include additional data that a user has specified for synching between devices associated with the user's identity (e.g., music). In some implementations, the user specifies a collection of data that is shared with other user devices. The collection can be logically represented as a shared folder, or as individual data items designated as belonging to the collection.

The shared synched data 118 includes data identified by the user for sharing with devices associated with other identities. In particular, the user can specify the particular identities with which the shared data is synched as well as the particular data (e.g., synchronizing images from the first identity 106 with the second identity 112). In some implementations, different shared data can be specified for different identities. For example, a user can share images with two identities, but only share video a single identity. The shared synched data 118 can include some, all, or none of the data from the default and other synched data 114 and 116. In some implementations, the user specifies a collection of data that is shared with particular identities. The collection can be logically represented as a shared folder, or as individual data items designated as belonging to the collection.

Device 104 similarly includes default synched data 120, other synched data 122, and shared synched data 124. Device 102 and device 104 are associated with the same identity. Therefore, synchronization between device 102 and device 104 synchronizes all of these data (default, other synched, and shared).

Device 108 similarly includes default synched data 126, other synched data 128, and shared synched data 130. Device 110 includes default synched data 132, other synched data 134, and shared synched data 136. Device 102 and device 104 are associated with the same identity (i.e., first identity 106). Therefore, synchronization between device 102 and device 104 synchronizes all of the data (default, other synched, and shared).

Synchronization of shared items can occur between one or more devices of each respective identity. In particular, as shown in FIG. 1, shared synched data 124 of the first identity 106 is synchronized with shared synched data 130 of device 108 of the second identity 112. Since the shared data is synchronized between devices associated with the same identity (e.g., between devices 102 and 104), either of the devices associated with the first identity 106 can synchronize with the second identity 112. Thus, data can be synchronized both between devices of the same identity (e.g., devices 102 and 104) and between devices of different identities (e.g., devices 104 and 108). In some implementations, synchronization between identities occurs between the same designated devices. For example, synchronization between the first identity 106 and the second identity 112 can always occur between device 104 and device 108.

Figure 2:
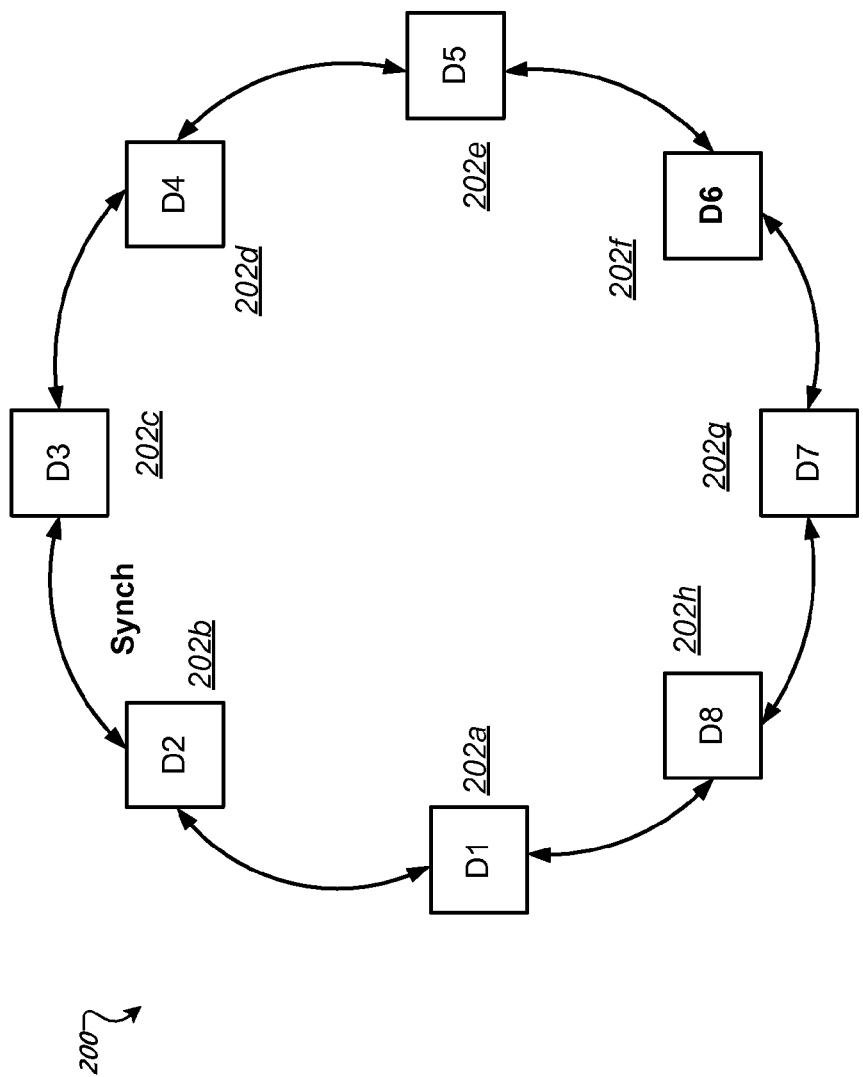
FIG. 2 is a diagram illustrating an example circle of devices for data synchronization.

FIG. 2 is a diagram illustrating an example circle of devices 200 for data synchronization. Circle of devices 200 shows 8 devices 202a-h logically arranged in a circle or ring. The physical arrangement and locations are not tied to the logical arrangement. Each of the devices 202a-h are devices between which data is synchronized. It can include both devices within the same identity or different identities. The devices 202a-h can communicate with other devices, for example, using one or more networks.

The logical circle arrangement can order devices by device identifiers. In particular, each device 202a-h has a unique device identifier value. Each device has a unique identifier value (e.g., a device ID). Each device can also have an alias list that give identifier to other devices to which the device synchronizes. The alias can be the actual device identifiers (e.g., received from the other devices), or can be assigned by the device for local use while, for example, maintaining a mapping to the actual device identifiers. Thus, in the example circle of devices 200, a first device 202a has a lowest device identifier number. The devices are ordered by increasing device number up to the eighth device 202h having the highest device identifier number. The circle arrangement has the device with the lowest device number adjacent to the device having the highest device number.

Data synchronization is performed between adjacent devices. For example, device 202c is synchronized with devices 202b and 202d. Similarly, device 202d is synchronized with devices 202c and 202e.

Devices do not directly synchronize with any devices that are not adjacent in the logical circle of devices. Thus, device 202b does not directly synchronize with device 202f. However, though synchronizations between device pairs, all data is synchronized with all devices in the circle of devices 200. While there can be some latency synchronizing, the network traffic is greatly reduced.

In some implementations, for data synchronization between a pair of devices in the circle of devices 200, one device is considered a server and the other a client. For example, the device having the lowest device identifier can be considered the server and initiate the synchronization with the device having the lower device identifier. Once the "server" has received any requested synchronization data, the roles are reversed so that the other device of the pair is also synchronized.

In the example circle of devices shown in FIG. 2, synchronization between device 202b and 202c is initiated by device 202b because it has the lower device identifier. However, device 202c initiates the synchronization between device 202c and 202d because device 202c then has the lower device identifier.

Synchronization between device 202a and device 202h is initiated by device 202a having the lowest device identifier (since device 202h has the highest device identifier). Thus, device 202a initiates the synchronization between both device 202b and 202h.

Figure 3:
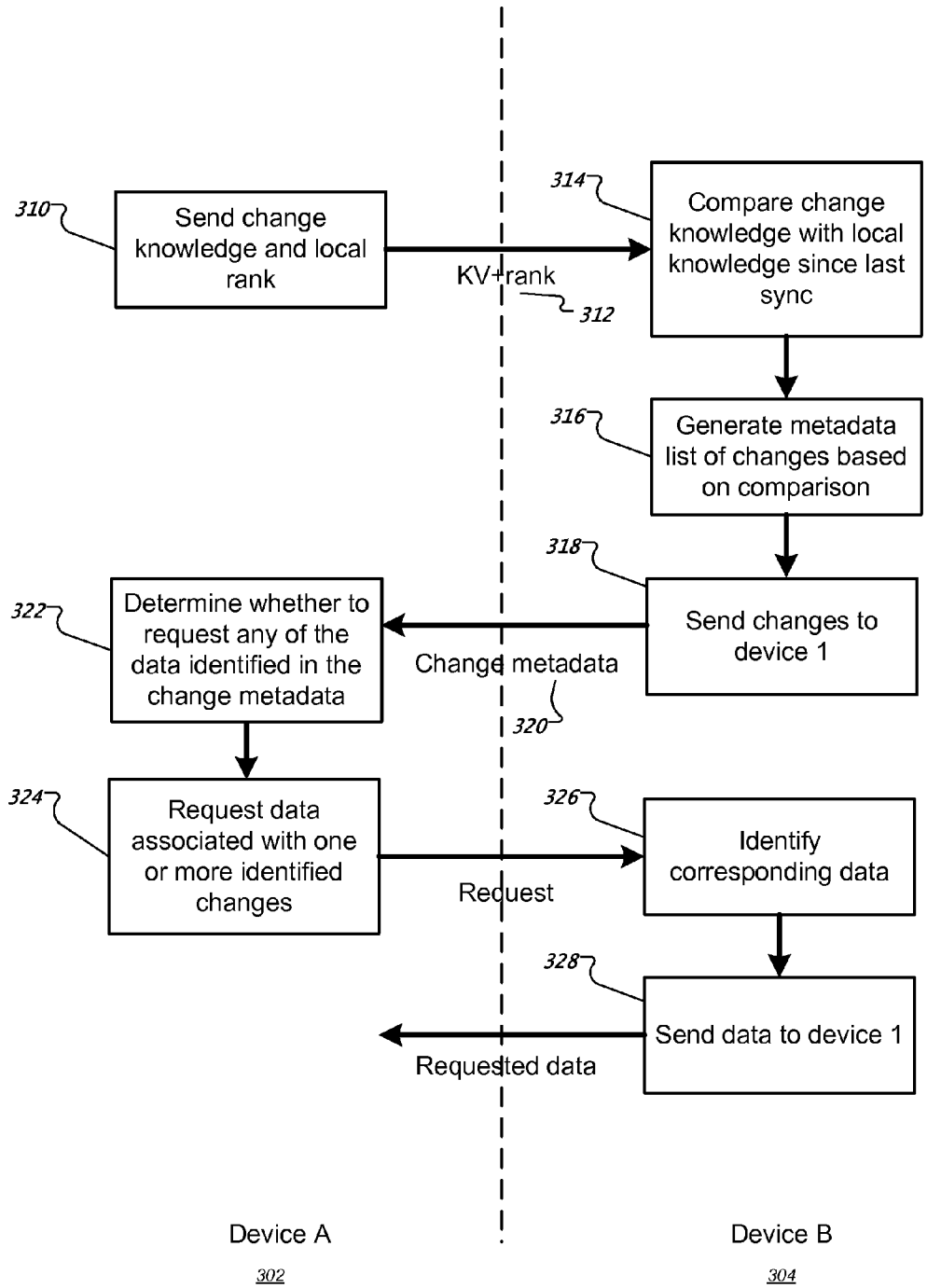
FIG. 3 is a data flow diagram illustrating an example of data synchronization between a pair of devices.

FIG. 3 is a data flow diagram 300 illustrating an example of data synchronization between a pair of devices. In particular, the flow diagram 300 illustrates synchronization between a first device 302 (device A) and a second device 304 (device B) initiated by the first device 302 (e.g., because the first device 302 has a lower device identifier).

The first device 302 sends (310) a change knowledge and local rank to the second device. The knowledge identifies a list of change identifiers for data items known to the first device and the local rank indicates a time at which the last synchronization occurred.

The change knowledge can be represented by a vector. The vector can include a latest change identifier for each data item known to the device. In particular, each data item (e.g., a file) has an item identifier. The item identifier identifies the device that created the item as well as an item identifier. In some implementations, the item identifier is a 64 bit item identifier that includes a 16 bit creator identifier (e.g., identifying which device created the data item) and 48 bit item identifier. These identifiers can be, e.g., hex values. For convenience, this will be represented in the specification in the form [A: 101] indicated data item 101 was created by device A.

When a data item is changed by a device, a change identifier is generated. For example, a user can modify a document to form a new version. In particular, the change identifier identifies the device making the change and a change identifier for that change. In some implementations, the change identifier is represented by a 64 bit change identifier including a 16 bit device identifier (e.g., which device changed the data item) and a 48 bit change identifier. These identifiers can be, e.g., hex values. For convenience, the combination of device and change identifiers will be represented in the form <[A: 101],[B: 127]> indicating data item 101 created by device A is associated with change 127 as changed by device B (e.g., representing a particular version of data item 101).

Each time a data item is changed, an increased change identifier is associated with the data item. A data item can be changed multiple times and by multiple devices. Thus, over time, a data item (e.g., [A:101]) can be associated with changes: [A:112], [B:120], [C: 137], [B: 140], and [B: 141] representing five distinct version of the original data item [A:101] as generated by devices A, B, and C, which are synchronized with each other.

Since the data item is synchronized between devices, it is possible for changes to be made by two different devices at close enough to the same time that the changes by one have not been synchronized before the changes by another. A conflict resolution process is used to identify the version of the data item to synchronize. This conflict resolution process is described in greater detail below with respect to FIG. 5.

The change knowledge of a particular device can be represented by a vector of changes for data items. The vector only includes the latest changes known to the device (i.e., the latest version of the data item known to the first device 302). Thus, all changed item identifiers (versions of the data item) do not need to be provided by the change knowledge, just the latest changes such that the most recent version of each data item can be determined between the devices.

The change knowledge vector (312) sent by a device during synchronization is a set of item identifiers and the latest change identifier for that item. For example:
<[A:101],[A:127]><[A:103],[B:152]><[B:202],[C:321]>
This example knowledge vector includes three data items: [A:101], [A:103], and [B:202] and the respective last seen changes for each of these data items. For example, data item [A:103] has change identifier [B:152] indicating that the last change "seen" (e.g., from a previous synchronization) by the device is the change 152 made by device B.

When the change knowledge vector and local rank is received by the second device 304, the second device 304 compares (314) the change knowledge with a local knowledge. In particular, a database on the second device 304 can store item identifiers and change identifiers known to the second device 304. For each change identified in the change vector, the second device 304 compares the change identifier with the known change identifier for that data item to determine whether a later change is available. Alternatively, the second device 304 can include a knowledge vector identifying all items and change identifiers known to the second device 304.

For example, the second device 304 can have knowledge:
<[A:101],[A:127]><[A:103],[C:164]><[B:202],[C:335]
><[B:206][B:102]>
Comparing this knowledge with the received change knowledge vector, the second device 304 determines that item [A:101] is unchanged and that later version of items [A:103] and [B:202] are known to the second device 304 based on the change identifiers for those items. For example, the change identifiers of the items known to the second device 304 being higher than the change identifiers received from the first device 302. Additionally, the second device 304 knows of item [B:206] that is unknown to the first device 302. For example, the data item [B:206] may have been created by the second device 304 (device B) recently so that it has not yet been synchronized with the first device 302.

The second device 304 generates (316) a list of changes to data items based on the comparison. The second device 304 then sends (318) the list of changes to the first device 302 as change metadata (320). The change metadata identifies which data items have later versions or were unknown to the first device 302. The change metadata can include the item and change identifiers for the unknown items/changes. Since the first data item [A:101] was unchanged, no information needs to be returned regarding that data item.

The first device 302 determines (322) whether to request any of the data identified in the change metadata. In some implementations, the first device 302 requests (324) data associated with one or more identified changes. In some implementations, all change data associated with the change metadata (e.g., later version of the data items) is requested. In some other implementations, some data is requested but not others. For example, the change metadata can include additional information that identifies a size of the data to be transferred. Large data transfers can be postponed to a later time (e.g., when network usage is lower, for example, at night). Thus, the whole knowledge is synchronized even though the underlying data may not be synchronized.

In some implementations, transfer is postponed so that first device 302 can retrieve the same data from a different device. For example, another device with which the first device is synchronized can have a faster connection to the first device 302 (e.g., Wi-Fi or wired network connection). The first device 302 can retrieve this data from the faster device. In some implementations, a different protocol is used to transfer data from identified data items than was used to send the change knowledge.

In some other implementations, data is requested only upon demand from a user of the first device 302. For example, a user requesting access to data item [A:103] can cause the first device 302 to retrieve the current version, e.g., [A:103], [C:164] from the second device 304 or from other device having the data.

For any data to be transferred to the first device 302, a request is sent to the second device 304. The second device 304 identifies (326) data associated with the request. In some implementations, the entire data items corresponding to the request is sent to the first device 302. In some alternative implementations, only portions of the data item changed from the last known version of the data item by the first device 302 are sent. For example, data items can be split into multiple chunks during transit and storage between devices. The chunking technique used can minimize the number of changed chunks between versions. As a result, only those new or changed chunks need to be transmitted to the first device 302, which already has the unchanged chunks. The identified data is sent 328 to the first device 302. In some implementations, the specific request for data and data transfer is performed using a distinct protocol from that used to perform the synchronization of knowledge between the devices.

Figure 4:
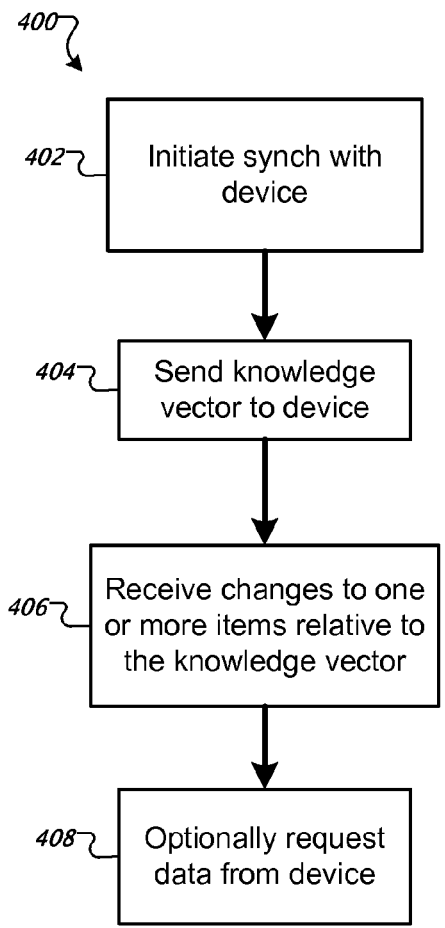
FIG. 4 is a flow diagram of an example process for initiating a synchronization with another device.

FIG. 4 is a flow diagram of an example process 400 for initiating synchronization with another device. The process 400 can be performed, for example, by a user device requesting synchronization from another device.

Synchronization is initiated (402). In particular, a first device can initiate synchronization with another device. The other device can be associated with a single identity or with another identity. In some implementations, the synchronization is initiated by a device based on the devices identifier relative to the device being synched to. For example, the device initiating the synchronization can have a lower device identifier. In some implementations, the device only initiates a synchronization process with a device having a next highest (or lowest) device identifier. In some other implementations, the device initiates the synchronization as a return synchronization after synchronizing with a device having a lower device identifier.

A change knowledge is sent by the device (404). In some implementations, the change knowledge is represented by a change knowledge vector. The vector can include change identifiers for data items known to the device. In particular, the change identifiers can include only the highest change identities for the items known to the device so that a compact representation of the change knowledge can be generated and transmitted. In some implementations, a local rank is also sent as part of the change knowledge.

Changes to one or more items relative to the change knowledge is received (406). The changes can be received as part of a metadata transmission that identifies which data items have newer change identifiers or new data items unknown to the device.

Data associated with the received changes is optionally requested (408). The device can request some, all, or none of the data associated with the received changes. Data associated with the received changes can include whole versions of data items or changed portions of the data items (e.g., changed or new chunks of the data item). Alternatively, the device can request the data at a later time from the same or a different device (e.g., in response to a user request for a data item for which there is a new version available).

Figure 5:
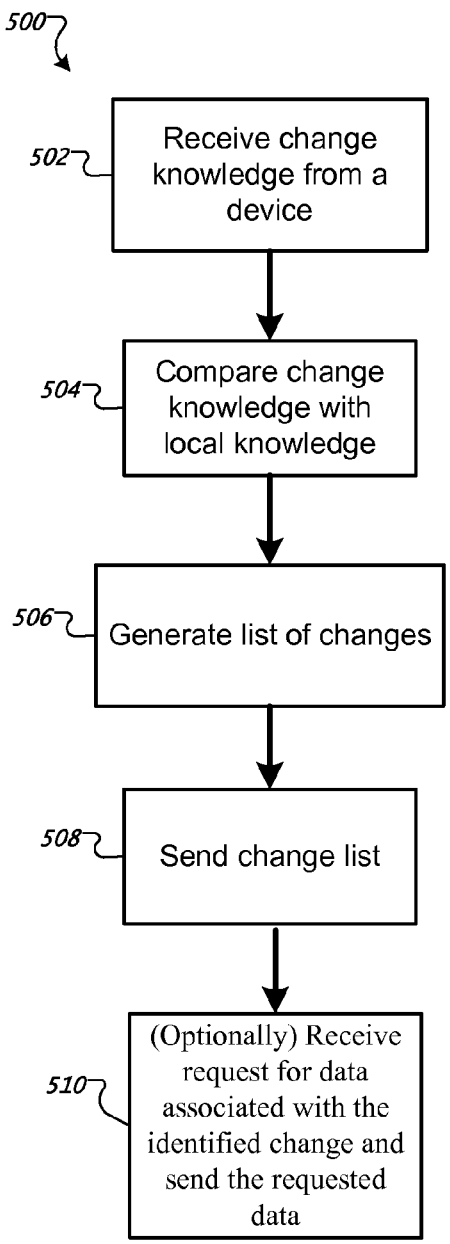
FIG. 5 is a flow diagram of an example process for responding to a synchronization request.

FIG. 5 is a flow diagram of an example process 500 for responding to a synchronization request. The process 500 can be performed, for example, by a user device receiving a request for synchronization from another device.

A change knowledge is received from a device (502). For example, another device that initiates synchronization can send a change knowledge to the device. The change knowledge can be sent as a change knowledge vector as described above.

The received change knowledge is compared to a local knowledge (504). In particular, the device has a knowledge that identifies all change identifiers and synchronized data items known to the device (e.g., both created by the device and received from prior synchronizations). In some implementations this is stored as a knowledge vector for the device. In some other implementations, this is stored in a searchable database. The item and change identifiers are compared to the local knowledge to identify changes to items having a higher change identifier value indicating a later version of the data item. Additionally, item identifiers are compared to identify newly created items unknown to the requesting device.

A list of changes is generated (506). For example, the list of changes can include a listing of item and change identifier values that are more recent or unknown to the requesting device. The change list is sent to the requesting device (508).

A request for data associated with the identified change is optionally received and the requested data sent (510). The requesting device can send a subsequent request after receiving the change list for data associated with the change list. The data can be the complete data items (e.g., for a new data item unknown to the requesting device) or only portions of the data item reflecting the changes (e.g., particular chunks of the data item that are changed relative to chunks of the data item already possessed by the requesting device). In some implementations, the request and transfer of data is conducted using different protocols than the synchronization request and change list transmission.

Figure 6:
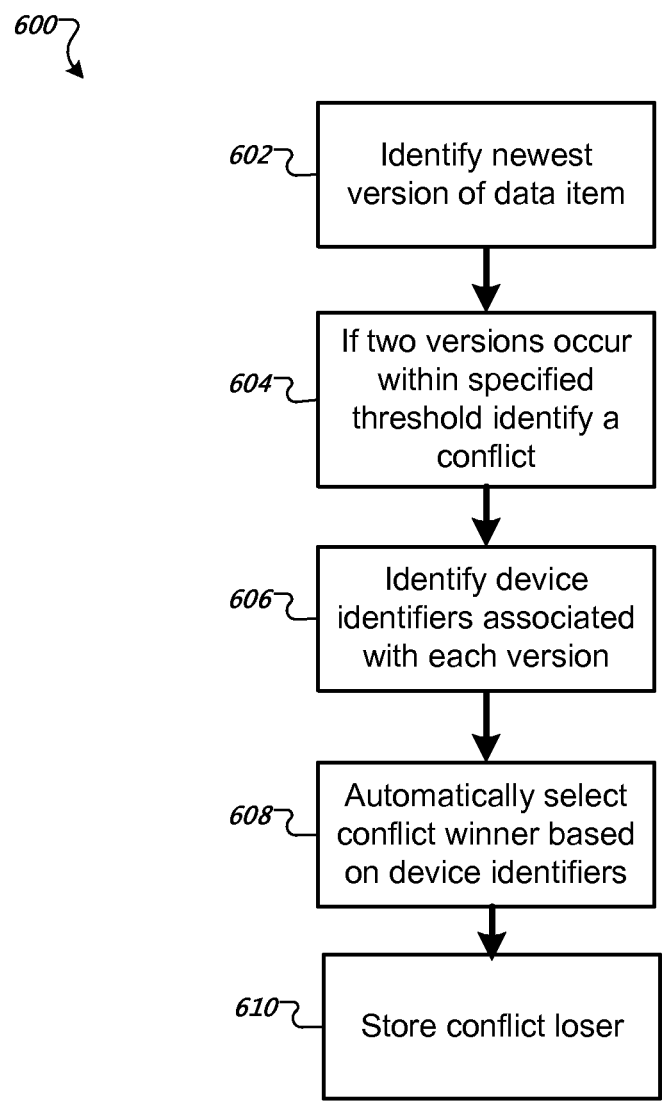
FIG. 6 is a flow diagram illustrating an example process for conflict resolution during synchronization.

FIG. 6 is a flow diagram illustrating an example process 600 for conflict resolution during synchronization. The process 600 can be performed, for example, by a user device requesting synchronization from another device.

A newest version of data item from a pair of data item versions is identified (602). In particular, each device of a pair of devices being synchronized has a version of the same data item. The change identifiers for the respective items can be used to determine which item of the pair is newest. In particular, since change identifiers are incremented with each new version based on a knowledge of all previous versions from prior synchronizations, the newest version of the data item can be identified according to the highest change identifier value.

A conflict is identified if the data item versions occur within a specified threshold time (604). While one data item has a change identifier that is higher than the other data item, they difference between the two can be within a threshold amount. For example, the threshold time can be one second meaning that both versions were created on the respective devices within one second of each other. When a conflict is identified, a version of the data item to be synchronized is determined.

Device identifiers associated with each version are identified (606). Each device has a particular device identifier as described above. This device identifier can be included in the change identifier as the device that made the modification resulting in the new version of the data item.

The conflict winner is automatically selected based on the respective device identifiers (608). In particular, the device identifiers are compared. In some implementations, the data item version from the device having the lowest device identifier is chosen as the conflict winner. Alternatively, the highest device identifier can be used.

The conflict loser is stored (610). In particular, the conflict loser can be stored as a version of the data item. The old versions including the conflict loser can be stored on the particular device in which the version was generated, can be synchronized over all devices, and/or can be stored in a versions repository for one or more of the devices. The stored data item can be associated with metadata or otherwise tagged to provide information about the conflict. Thus, if a user requests the conflict loser they can retrieve information about the conflict.

In some implementations, shared data (e.g., between devices of the same identify or between different identities) is checked prior to transfer. In particular, the data can be validated to ensure that the data includes data or valid data. In some implementations, when sharing portions of data (e.g., chunks of a larger data item) a signature of the chunk can be validated before synching the chunk.

Figure 7:
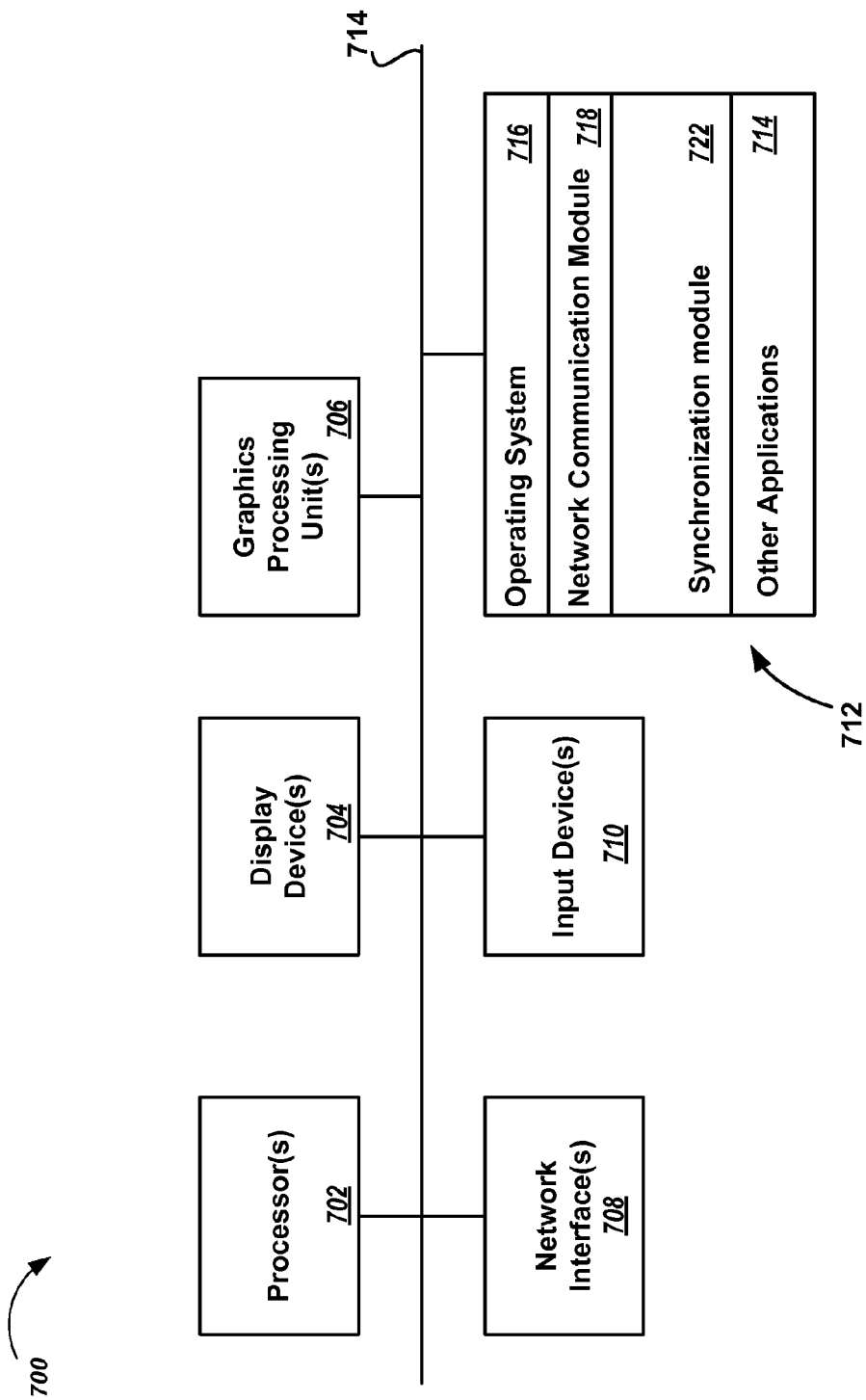
FIG. 7 illustrates an example system architecture.

FIG. 7 illustrates an example system architecture 700. The system architecture 700 is capable of performing operations for performing content based chunking of data items. The architecture 700 includes one or more processors 702 (e.g., IBM PowerPC, Intel Pentium 4, etc.), one or more display devices 704 (e.g., CRT, LCD), graphics processing units 806 (e.g., NVIDIA GeForce, etc.), a network interface 708 (e.g., Ethernet, FireWire, USB, etc.), input devices 710 (e.g., keyboard, mouse, etc.), and one or more computer-readable mediums 712. These components exchange communications and data using one or more buses 714 (e.g., EISA, PCI, PCI Express, etc.).

The term "computer-readable medium" refers to any medium that participates in providing instructions to a processor 702 for execution. The computer-readable medium 712 further includes an operating system 716 (e.g., Mac OS®, Windows®, Linux, etc.), a network communication module 718, a synchronization module 722, and other applications 724.

The operating system 716 can be multi-user, multiprocessing, multitasking, multithreading, real-time and the like. The operating system 716 performs basic tasks, including but not limited to: recognizing input from input devices 710; sending output to display devices 704; keeping track of files and directories on computer-readable mediums 712 (e.g., memory or a storage device); controlling peripheral devices (e.g., disk drives, printers, etc.); and managing traffic on the one or more buses 714. The network communications module 718 includes various components for establishing and maintaining network connections (e.g., software for implementing communication protocols, such as TCP/IP, HTTP, Ethernet, etc.).

The synchronization module 722 provides various software components for performing the various functions for performing synchronization between devices as described with respect to FIGS. 1-6.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:
1. A method comprising:
    identifying a first version of a data item to synchronize from a first device using a first change identifier associated with the data item;
    identifying a second version of the data item to synchronize from a second device using a second change identifier associated with the data item;
    upon determining that the first version and the second version occurred within a specified threshold, determining that there is a conflict between the first version of the data item and the second version of the data item; and upon determining that there is a conflict, resolving the conflict, including:
  determining, from the first change identifier, a first device identifier identifying the first device;
  determining, from the second change identifier, a second device identifier identifying the second device;
  selecting, from the first version of the data item and the second version of the data item, a conflict winner by comparing the first device identifier and the second device identifier and designating a version of the data item as stored on a device identified by a lowest device identifier or highest device identifier as the conflict winner;
  designating the version not selected as the conflict winner as a conflict loser; and
  storing a copy of the conflict loser.

2. The method of claim 1, comprising retrieving the stored conflict loser upon request.

3. The method of claim 1, wherein the first device and second device are devices among a plurality of devices logically arranged into a ring, the first device and second device being logically adjacent to each other in the ring.

4. The method of claim 3, wherein each device in the ring is associated with a device identifier, logically adjacent devices having device identifiers adjacent in value, wherein a device having a lowest device identifier is logically adjacent to a device having a highest device identifier, and wherein data synchronization is performed between logically adjacent devices.

5. The method of claim 4, wherein the data item is not directly synchronized between devices in the ring that are not logically adjacent to one another.

6. The method of claim 1, wherein the first device is designated as a server performing actions of resolving the conflict, the second device being designated as a client, and, after resolving the conflict, the second device is designated as a server, the first device being designated as a client.

7. A non-transitory storage device storing instructions that, when executed by one or more processors, cause the one or more processors to perform operations comprising:
  identifying a first version of a data item to synchronize from a first device using a first change identifier associated with the data item;
  identifying a second version of the data item to synchronize from a second device using a second change identifier associated with the data item;
  upon determining that the first version and the second version occurred within a specified threshold, determining that there is a conflict between the first version of the data item and the second version of the data item; and
  upon determining that there is a conflict, resolving the conflict, including:
    determining, from the first change identifier, a first device identifier identifying the first device;
    determining, from the second change identifier, a second device identifier identifying the second device;
    selecting, from the first version of the data item and the second version of the data item, a conflict winner by comparing the first device identifier and the second device identifier and designating a version of the data item as stored on a device identified by a lowest device identifier or highest device identifier as the conflict winner;
    designating the version not selected as the conflict winner as a conflict loser; and
    storing a copy of the conflict loser.

8. The non-transitory storage device of claim 7, the operations comprising retrieving the stored conflict loser upon request.

9. The non-transitory storage device of claim 7, wherein the first device and second device are devices among a plurality of devices logically arranged into a ring, the first device and second device being logically adjacent to each other in the ring.

10. The non-transitory storage device of claim 9, wherein each device in the ring is associated with a device identifier, logically adjacent devices having device identifiers adjacent in value, wherein a device having a lowest device identifier is logically adjacent to a device having a highest device identifier, and wherein data synchronization is performed between logically adjacent devices.

11. The non-transitory storage device of claim 10, wherein the data item is not directly synchronized between devices in the ring that are not logically adjacent to one another.

12. The non-transitory storage device of claim 7, wherein the first device is designated as a server performing actions of resolving the conflict, the second device being designated as a client, and, after resolving the conflict, the second device is designated as a server, the first device being designated as a client.

13. A system comprising:
  a first device; and
  a second device connected to a the first device, the second device being configured to perform operations comprising:
  identifying a first version of a data item to synchronize from a first device using a first change identifier associated with the data item;
  identifying a second version of the data item to synchronize from a second device using a second change identifier associated with the data item;
  upon determining that the first version and the second version occurred within a specified threshold, determining that there is a conflict between the first version of the data item and the second version of the data item; and
  upon determining that there is a conflict, resolving the conflict, including:
    determining, from the first change identifier, a first device identifier identifying the first device;
    determining, from the second change identifier, a second device identifier identifying the second device;
    selecting, from the first version of the data item and the second version of the data item, a conflict winner by comparing the first device identifier and the second device identifier and designating a version of the data item as stored on a device identified by a lowest device identifier or highest device identifier as the conflict winner;
    designating the version not selected as the conflict winner as a conflict loser; and
    storing a copy of the conflict loser.

14. The system of claim 13, the operations comprising retrieving the stored conflict loser upon request.

15. The system of claim 13, wherein the first device and second device are devices among a plurality of devices logically arranged into a ring, the first device and second device being logically adjacent to each other in the ring.

16. The system of claim 15, wherein each device in the ring is associated with a device identifier, logically adjacent devices having device identifiers adjacent in value, wherein a device having a lowest device identifier is logically adjacent to a device having a highest device identifier, and wherein data synchronization is performed between logically adjacent devices.

17. The system of claim 16, wherein the data item is not directly synchronized between devices in the ring that are not logically adjacent to one another.

18. The system of claim 13, wherein the second device is designated as a server, the first device being designated as a client, and, after resolving the conflict, the first device is designated as a server, the second device being designated as a client.

* * * * *